(12) United States Patent
Li

(10) Patent No.: US 6,666,051 B1
(45) Date of Patent: Dec. 23, 2003

(54) GUARDING LOCK FOR CAMPING TRAILER

(75) Inventor: Show-Mon Li, Changhua (TW)

(73) Assignee: Vulcan Sports Co., Ltd., Changhua (TW)

( * ) Notice: Subject to any disclaimer, the term of this patent is extended or adjusted under 35 U.S.C. 154(b) by 0 days.

(21) Appl. No.: 10/229,088

(22) Filed: Aug. 28, 2002

(51) Int. Cl.⁷ .............................................. B60R 25/00
(52) U.S. Cl. .............................. 70/14; 70/18; 70/38 A; 70/39; 70/258; 280/507
(58) Field of Search ............................... 70/14, 18, 19, 70/38 A, 39, 58, 258, 232, 237, 234, 235; 280/507, 511; 248/551–553

(56) References Cited

U.S. PATENT DOCUMENTS

| | | | | |
|---|---|---|---|---|
| 1,543,397 A | * | 6/1925 | Schroeder | |
| 3,790,192 A | * | 2/1974 | Green | 280/507 |
| 3,924,878 A | * | 12/1975 | Utman et al. | 280/507 |
| 4,032,171 A | * | 6/1977 | Allen et al. | 280/507 |
| 4,577,884 A | * | 3/1986 | Harris | 280/507 |
| 4,756,172 A | * | 7/1988 | Weaver | 70/58 |
| 5,087,064 A | * | 2/1992 | Guhlin | 280/507 |
| 5,094,423 A | * | 3/1992 | Almquist et al. | 248/552 |
| 5,219,435 A | * | 6/1993 | Sprunger | 280/511 |
| 5,394,712 A | * | 3/1995 | Chou | 70/38 A |
| 5,700,024 A | * | 12/1997 | Upchurch | 280/507 |
| 5,823,021 A | * | 10/1998 | Chang | 70/38 A |
| 6,155,589 A | * | 12/2000 | Simpson | 280/507 |

FOREIGN PATENT DOCUMENTS

| | | | | |
|---|---|---|---|---|
| DE | 393521 | * | 4/1924 | 70/39 |
| GB | 1206333 | * | 9/1970 | 70/14 |
| GB | 1230309 | * | 4/1971 | 70/38 A |
| GB | 1350086 | * | 4/1974 | 70/18 |

* cited by examiner

Primary Examiner—Lloyd A. Gall
(74) Attorney, Agent, or Firm—Rosenberg, Klein & Lee

(57) ABSTRACT

A guarding lock for a camping trailer and particularly an anti-theft guarding lock for a camping trailer to prevent the trailer from being stolen and hauled away illegitimately mainly includes a lock having a semispherical dome located thereon. A U-shaped lock bar is provided to couple with the lock for fastening to a connection socket of the trailer such that the semispherical dome is housed in and coupled with a semispherical trough formed in the connection socket to achieve anti-theft function for the trailer.

3 Claims, 6 Drawing Sheets

GUARDING LOCK FOR CAMPING TRAILER

BACKGROUND OF THE INVENTION

1. Field of the Invention

The invention relates to a guarding lock for a camping trailer and particularly an anti-theft guarding lock for a camping trailer for preventing the trailer from being stolen and hauled away.

2. Description of the Prior Art

Travel in a do-it-yourself (DIY) fashion has become increasingly popular nowadays. Whether to go swimming and enjoying water activities on the beach, or camping outdoors, a common car has space constraint and is difficult to carry all necessary goods besides accommodating people. As a result, dedicated camp trailers have been developed and introduced to meet this requirement. The camp trailer usually is hauled by a car (as shown in FIG. 1). The trailer 1 has a connection apparatus 11 located at the front side. The connection apparatus 11 has a connection socket 112 located at a front end thereof with a semispherical trough 113 formed therein to couple with the car for hauling. When the camping trailer is parked on a camping site (or field of activity) or stationed according to regulations, the camping trailer must be disconnected and separated from the car. In such a situation a support rack 12 is provided to hold the camping trailer upright without tilting or toppling. As camping sites and recreation areas are generally accessible freely by all people, it is not unusual that unattended camping trailers are subjected to theft and be hauled away illegitimately. It could cause a great loss to the owners of the camping trailers.

SUMMARY OF THE INVENTION

In view of the aforesaid disadvantages, the object of the invention is to provide a guarding lock for a camping trailer that has a semispherical dome located on a lock and a U-shaped lock bar to couple with the lock for fastening to a connection socket of the trailer. The semispherical dome on the lock may be housed in a semispherical trough of the connection socket to form a secured coupling to prevent the trailer from being hauled away.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
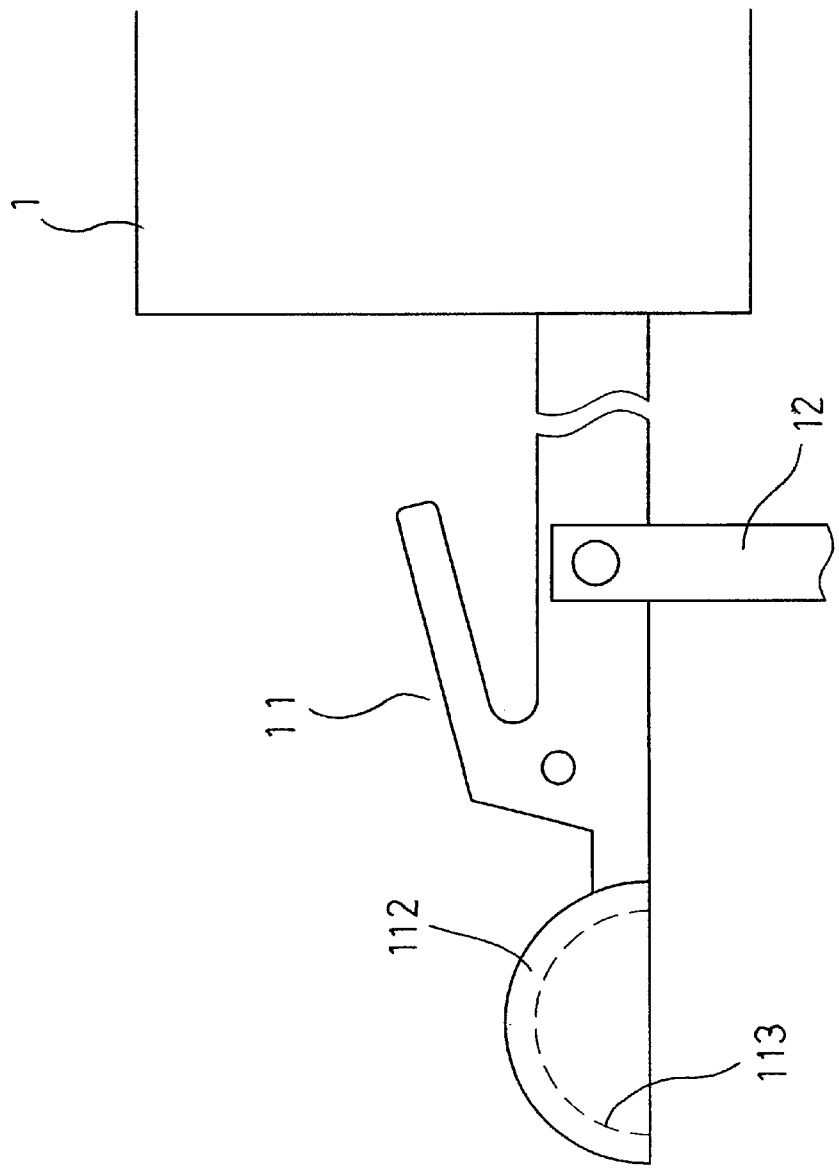
FIG. 1 is a schematic view of a connection apparatus of a conventional camping trailer.
Figure 2:
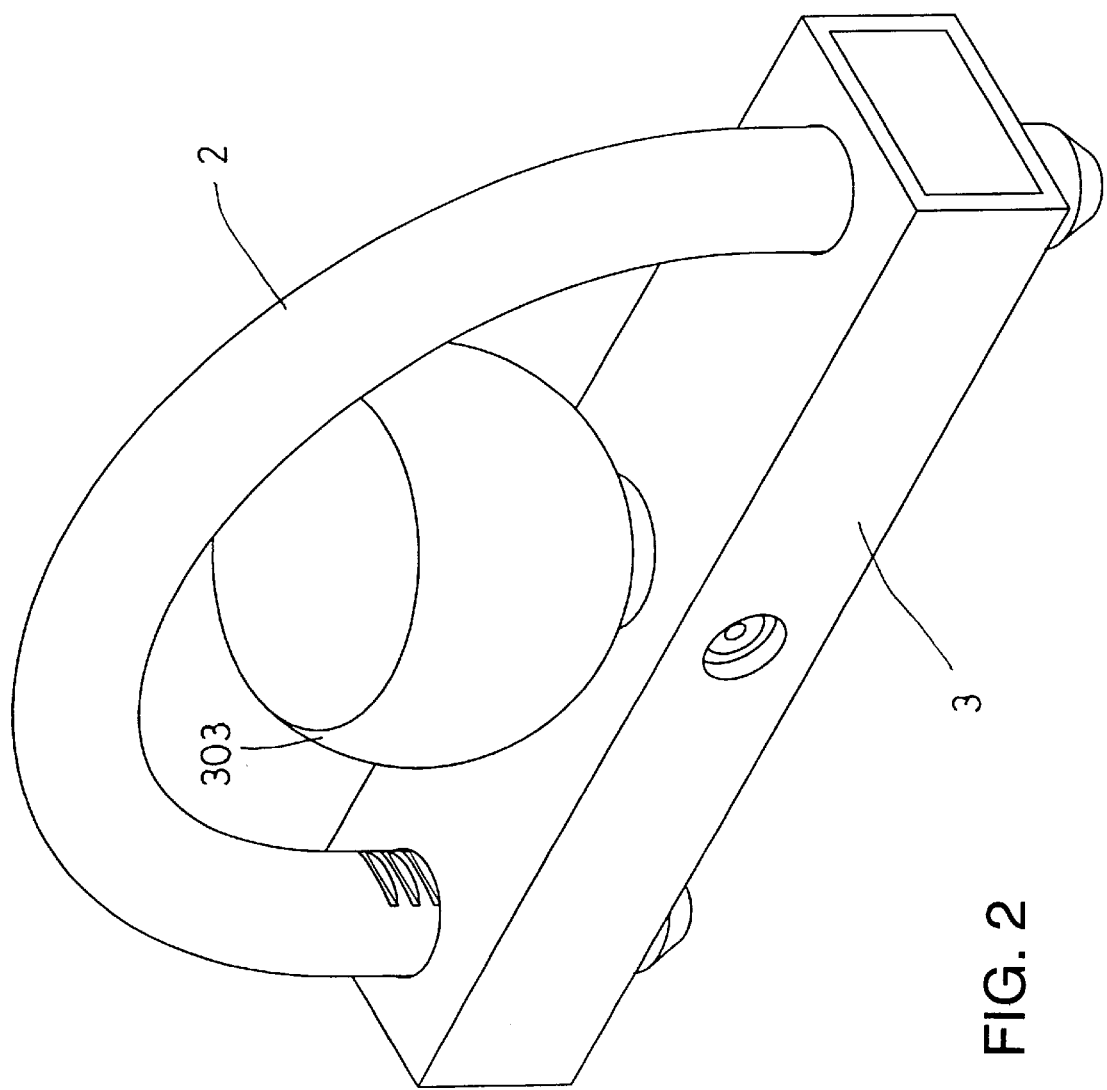
FIG. 2 is a perspective view of the invention.
Figure 3:
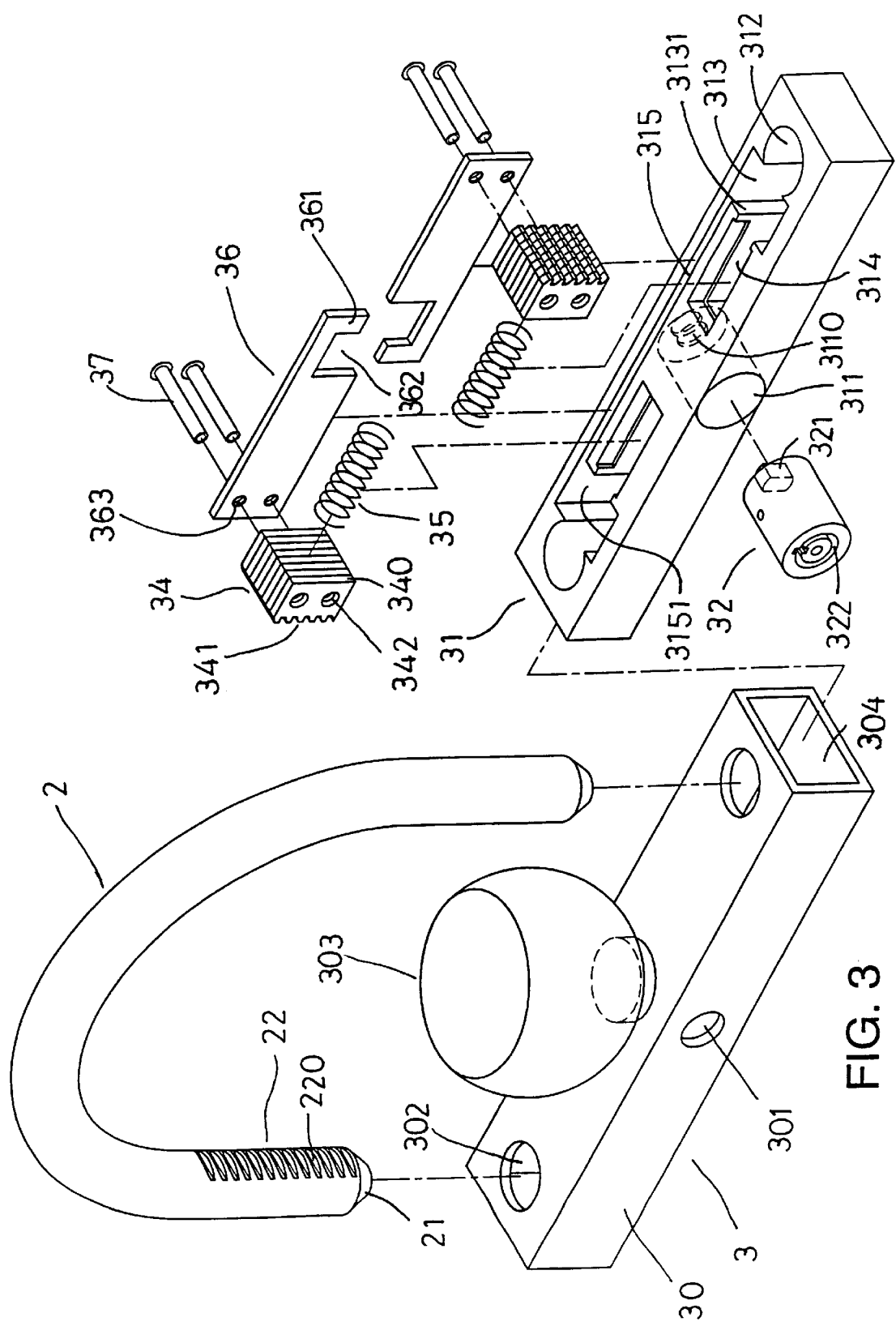
FIG. 3 is an exploded view of the invention.
Figure 6:
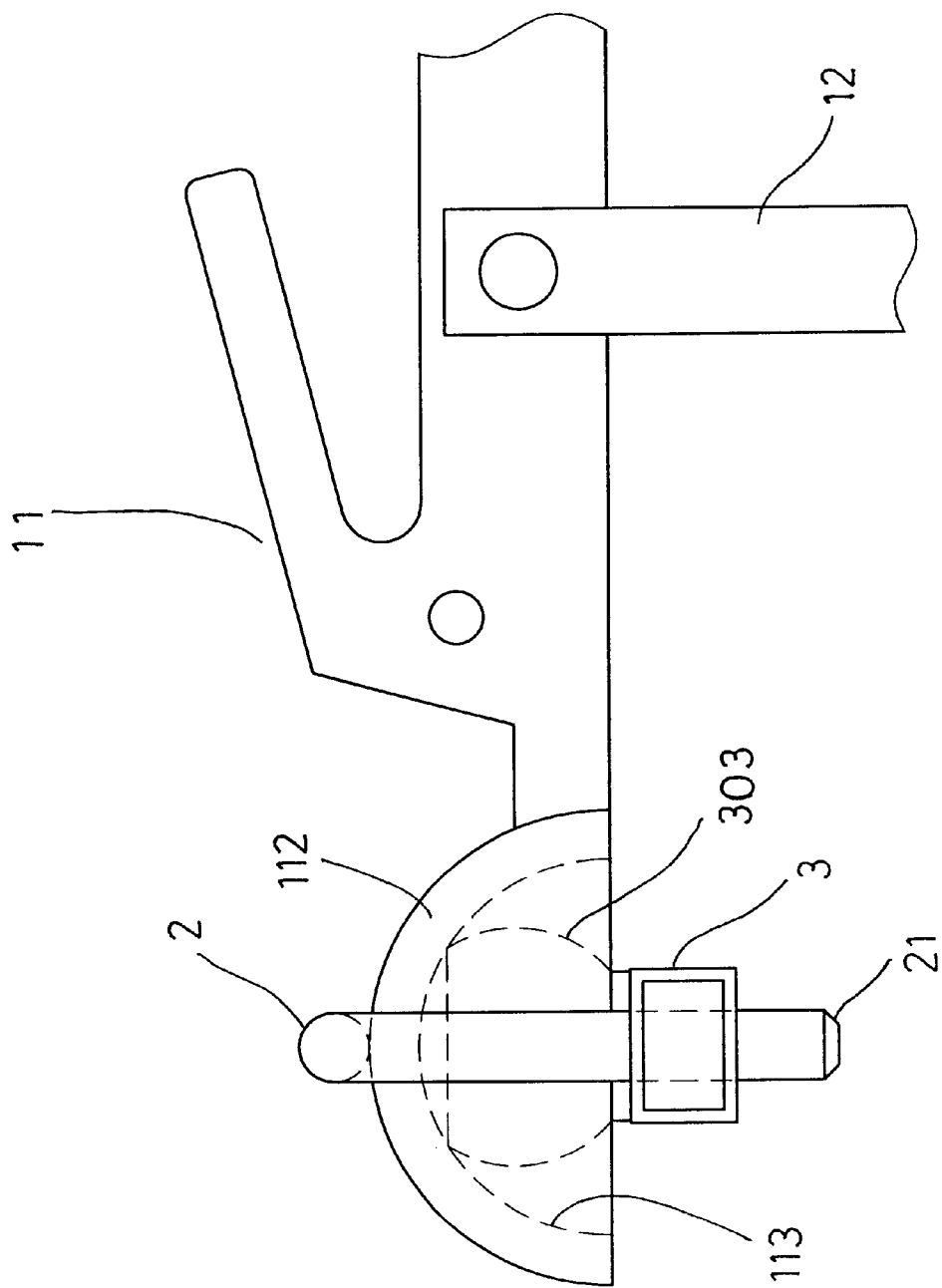
FIG. 6 is a schematic view of an embodiment of the invention.

Referring to FIGS. 2, 3 and 6, the invention mainly includes a U-shaped lock bar 2 and a lock 3 for fastening to a connection socket 112 of a trailer.

The U-shaped lock bar 2 is a U-shaped bar element with two ends forming respectively an insert end 21 for inserting into the lock 3. The insert end 21 has an inner side formed a latch groove rack 22 which consists of at least one latch groove 220. Each latch groove 220 is a one-way slant groove.

The lock 3 is for receiving the U-shaped lock bar 2 to form a locked condition. It has a semispherical dome 303 located thereon for coupling with a semispherical trough 113 formed in the connection socket 112 to protect the trailer from being hauled away illegitimately.

The lock further includes:

- a lock shell 30 which is a hollow casing with a housing compartment 304 located therein, and has two ends each having an inset hole 302. The semispherical dome 303 is located on a middle portion on the top thereof. It further has an opening 301 formed on a lateral side;
- a lock body 31 corresponding to the housing compartment 304 of the lock shell 30 and being housed therein. It has a lock core cavity 311 formed transversely on one side in the middle portion, two ends each having an insert opening 312, a lock element trough 313 extended from an inner side of the insert opening 312, a spring trough 314 extended from a front inner wall 3131 of the lock element trough 313, and a sliding plate trough 315 located on a rear inner wall 3151 of the lock body 31. The sliding plate trough 315 communicates with the two lock element troughs 313 and has an aperture 3110 formed in the center to communicate with the lock core cavity 311;
- a lock core 32 housed in the lock core cavity 311 of the lock body 31 having a lock tongue 321 located on one side and a key way 322 located on another side corresponding to the opening 301 of the lock shell 30 for receiving a key;
- two lock elements 34 housed respectively in the lock element troughs 313 at two sides of the lock body 31 each having at least two apertures 342 and a one-way slant teeth rack 341 located on an outer side thereof corresponding to and engageable with the latch groove rack 22 of the U-shaped lock bar 2;
- two springs 35 housed respectively in the spring troughs 314 located on two sides of the lock body 31 for pushing the lock elements 34 outwards in normal conditions; and
- two sliding plates 36 housed respectively in two sides of the sliding plate trough 315 of the lock body 31 each having a notch 362 and a trigger stub 361. The notch 362 and the trigger stub 361 of one sliding plate 36 face the notch 362 and the trigger stub 361 of another sliding plate 36 in an up and down manner. Each sliding plate 36 has at least two holes 363 formed at one end to receive rivets 37 for pivotally engaging with the corresponding apertures 342 on the lock element 34.

Figure 4:
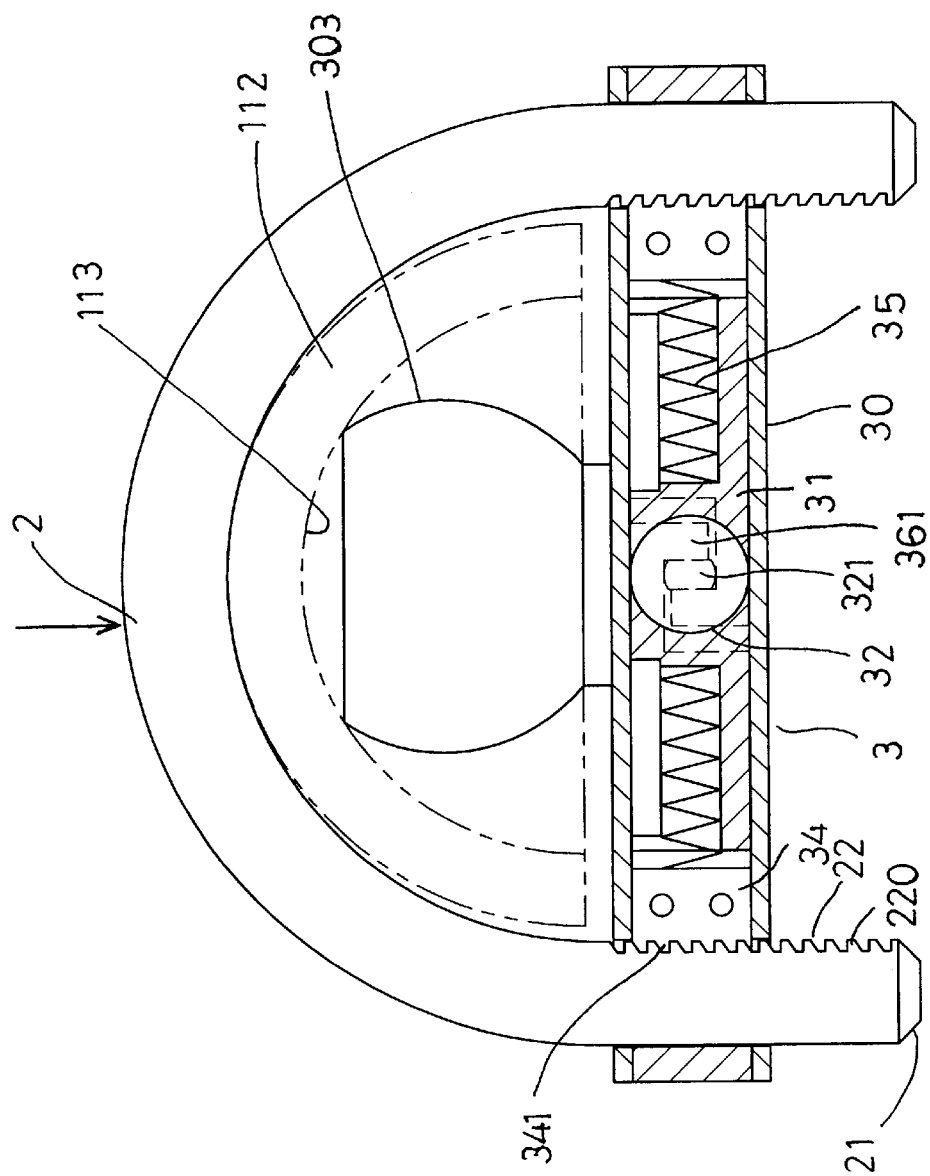
FIG. 4 is a schematic view of the invention in a locked condition.

By means of the construction set forth above, when in use to lock the connection socket 112 of the camping trailer (referring to FIGS. 4 and 6), first dispose the semispherical dome 303 of the lock 3 in the semispherical trough 113 of the connection socket 112. Then insert the insert ends 21 of the U-shaped lock bar 2 into the insert holes 302 and insert openings 312 of the lock 3 from above the connection socket 112. As the lock elements 34 are being pushed outwards by the springs 35 in normal conditions, and the slant teeth rack 341 of the lock elements 34 are engageable in one-way with the latch groove rack 22 of the U-shaped lock bar 2, the U-shaped lock bar 2 can only be moved downwards to engage securely with the lock 3 to form a locked condition.

Figure 5:
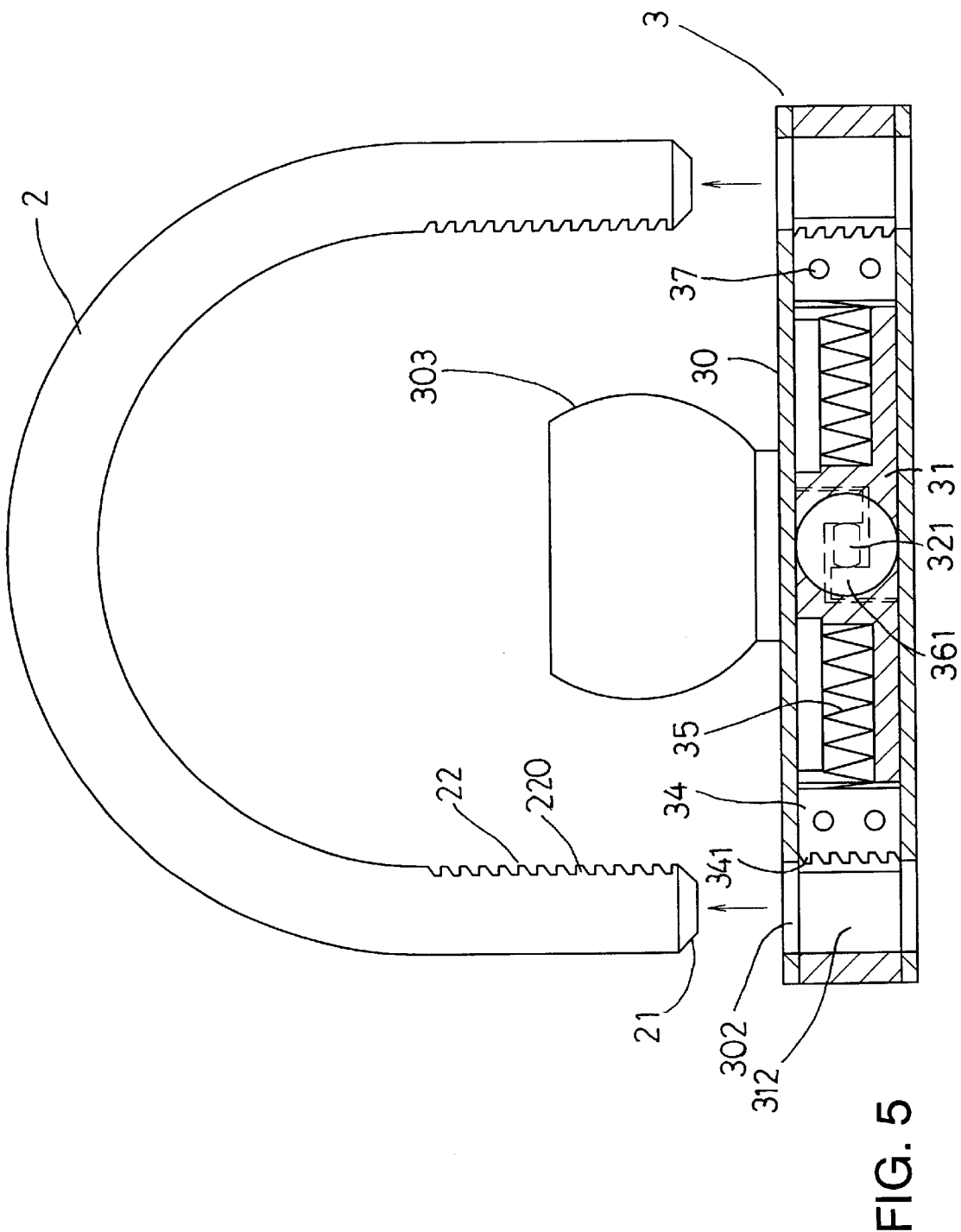
FIG. 5 is a schematic view of the invention in an unlocked condition.

When there is a desire to unlock (referring to FIG. 5), insert the key into the key way 322 to turn and drive the lock tongue 321. The trigger stubs 361 of the sliding plates 36 will be pushed and moved inwards. As a result, the lock elements 34 will be moved synchronously inwards to make the latch groove rack 22 of the U-shaped lock bar 2 separating from the slant teeth rack 341 of the lock elements 34. Thus the U-shaped lock bar 2 may be removed from the insert holes 302 and insert openings 312 to accomplish the unlocking operation.

In addition, the lock element 34 may be made in one piece or be a block formed by stacking and coupling a plurality of thin lock laminates 340 made in the same shape. The fabrication may be done easier at a lower cost.

In summary, the guarding lock of the invention can effectively prevent the trailer from being hauled away illegitimately and provide an effective anti-theft function.

I claim:

1. A guarding lock for a camping trailer comprising a U-shaped lock bar and a lock for fastening to a connection socket of the trailer, wherein:

the U-shaped lock bar is a U-shaped bar element and has two ends formed respectively with an insert end, the insert end having an inner side formed with a latch groove rack including at least one latch groove which is a one-way slant groove; and the lock is for receiving the insert ends of the U-shaped lock bar to form a locked condition and has a semispherical dome located thereon for coupling with a semispherical trough formed in the connection socket to protect the trailer from being hauled away, the lock further including:

a. a hollow lock shell having a housing compartment located therein, two ends of the hollow lock shell each having an insert hole, the semispherical dome being located on a middle portion thereof, and an opening formed on a lateral side thereof:

b. a lock body corresponding to the housing compartment of the lock shell and being housed therein, the lock body having a lock core cavity formed transversely in one side of a middle portion thereof, two ends each having an insert opening, a lock element trough extending from an inner side of the insert opening, a spring trough extending from a front inner wall of the lock element trough, and a sliding plate trough located on a rear inner wall of the lock element troughs and being in open communication with the two lock element troughs, the sliding plate trough having an aperture formed in a center thereof to communicate with the lock core cavity:

c. a lock core housed in the lock core cavity of the lock body having a lock tongue located on one side and a key way located on another side corresponding to the opening of the lock shell for receiving a key;

d. two lock elements housed respectively in the lock element troughs at two sides of the lock body, each lock element having at least two apertures and a one-way slant tooth rack located on an outer side thereof in correspondence to and engageable with a respective one of the latch groove racks of the U-shaped lock bar;

e. two springs housed respectively in the spring troughs located on two sides of the lock body for pushing the lock elements outwards in a normal condition; and f. two sliding plates housed respectively in two sides of the sliding plate trough, each sliding plate having a notch and a trigger stub, the notch and the trigger stub of one sliding plate facing the notch and the trigger stub of the other sliding plate in an up and down manner, each sliding plate having at least two holes formed at one end thereof to receive rivets for engaging with the corresponding apertures on the lock elements.

2. The guarding lock for a camping trailer of claim 1, wherein each lock element is a block formed in one-piece formation.

3. The guarding lock for a camping trailer of claim 1, wherein each lock element is a block formed by stacking and coupling together a plurality of similarly shaped thin lock laminates.

* * * * *